United States Patent
Vasseur et al.

(10) Patent No.: US 11,528,231 B2
(45) Date of Patent: Dec. 13, 2022

(54) ACTIVE LABELING OF UNKNOWN DEVICES IN A NETWORK

(71) Applicant: Cisco Technology, Inc., San Jose, CA (US)

(72) Inventors: Jean-Philippe Vasseur, Saint Martin d'uriage (FR); Grégory Mermoud, Veyras (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 43 days.

(21) Appl. No.: 16/194,666

(22) Filed: Nov. 19, 2018

(65) Prior Publication Data

US 2020/0162425 A1 May 21, 2020

(51) Int. Cl.
*H04L 47/2483* (2022.01)
*H04L 43/16* (2022.01)
*H04L 41/0893* (2022.01)
*H04L 47/2441* (2022.01)
*H04L 41/12* (2022.01)
*H04L 43/04* (2022.01)
*H04L 43/065* (2022.01)
(Continued)

(52) U.S. Cl.
CPC ...... *H04L 47/2483* (2013.01); *H04L 41/0893* (2013.01); *H04L 41/12* (2013.01); *H04L 43/04* (2013.01); *H04L 43/065* (2013.01); *H04L 43/16* (2013.01); *H04L 47/2441* (2013.01); *H04L 41/16* (2013.01); *H04L 2101/365* (2022.05)

(58) Field of Classification Search
CPC .... H04L 41/0893; H04L 67/303; H04L 67/30

USPC ........................................................ 709/223
See application file for complete search history.

(56) References Cited

U.S. PATENT DOCUMENTS 9,195,910 B2  11/2015 Garera et al.
9,584,540 B1   2/2017 Chan et al.
(Continued)

OTHER PUBLICATIONS

Liu et al., "Improving Learning-from-Crowds through Expert Validation", Proceedings of the Twenty-Sixth International Joint Conference on Artificial Intelligence (IJCAI-17), pp. 2329-2336, Mar. 24, 2017., IJCAI.

*Primary Examiner* — Kevin T Bates
*Assistant Examiner* — Emad Siddiqi
(74) *Attorney, Agent, or Firm* — Behmke Innovation Group LLC; Kenneth J. Heywood; Jonathon P. Western

(57) ABSTRACT

In one embodiment, a labeling service receives telemetry data for a cluster of endpoint devices in a first network environment. The endpoint devices in the cluster are clustered by a device classification service based on their telemetry data and labeled by a device type classifier of the device classification service as being of an unknown device type. The labeling service obtains a first device type label for the cluster of endpoint devices via a first user interface. The labeling service identifies one or more other network environments in which endpoint devices are located that have similar telemetry data as that of the cluster of endpoint devices. The labeling service obtains device type labels for the cluster of endpoint devices via a selected set of user interfaces from the identified one or more other network environments. The labeling service validates the first device type label for the cluster using the device type labels obtained via the selected set of user interfaces from the identified one or more other network environments.

20 Claims, 9 Drawing Sheets

(51) Int. Cl.
*H04L 41/16* (2022.01)
*H04L 101/365* (2022.01)

(56) References Cited

U.S. PATENT DOCUMENTS

| | | | |
|---|---|---|---|
| 9,704,106 B2 | 7/2017 | Welinder et al. | |
| 9,767,419 B2 | 9/2017 | Venanzi et al. | |
| 2010/0161804 A1* | 6/2010 | Jeon | H04L 67/02 |
| | | | 709/226 |
| 2010/0299338 A1* | 11/2010 | Aarni | H04W 8/22 |
| | | | 707/769 |
| 2012/0284090 A1* | 11/2012 | Marins | G06Q 10/0631 |
| | | | 705/7.39 |
| 2014/0314311 A1* | 10/2014 | Garera | G06K 9/6263 |
| | | | 382/159 |
| 2017/0149775 A1* | 5/2017 | Bachar | H04L 67/10 |
| 2018/0375887 A1* | 12/2018 | Dezent | H04L 41/142 |
| 2020/0242488 A1* | 7/2020 | Medas | H04L 67/303 |

* cited by examiner

ACTIVE LABELING OF UNKNOWN DEVICES IN A NETWORK

TECHNICAL FIELD

The present disclosure relates generally to computer networks, and, more particularly, to the active labeling of unknown devices in a network.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
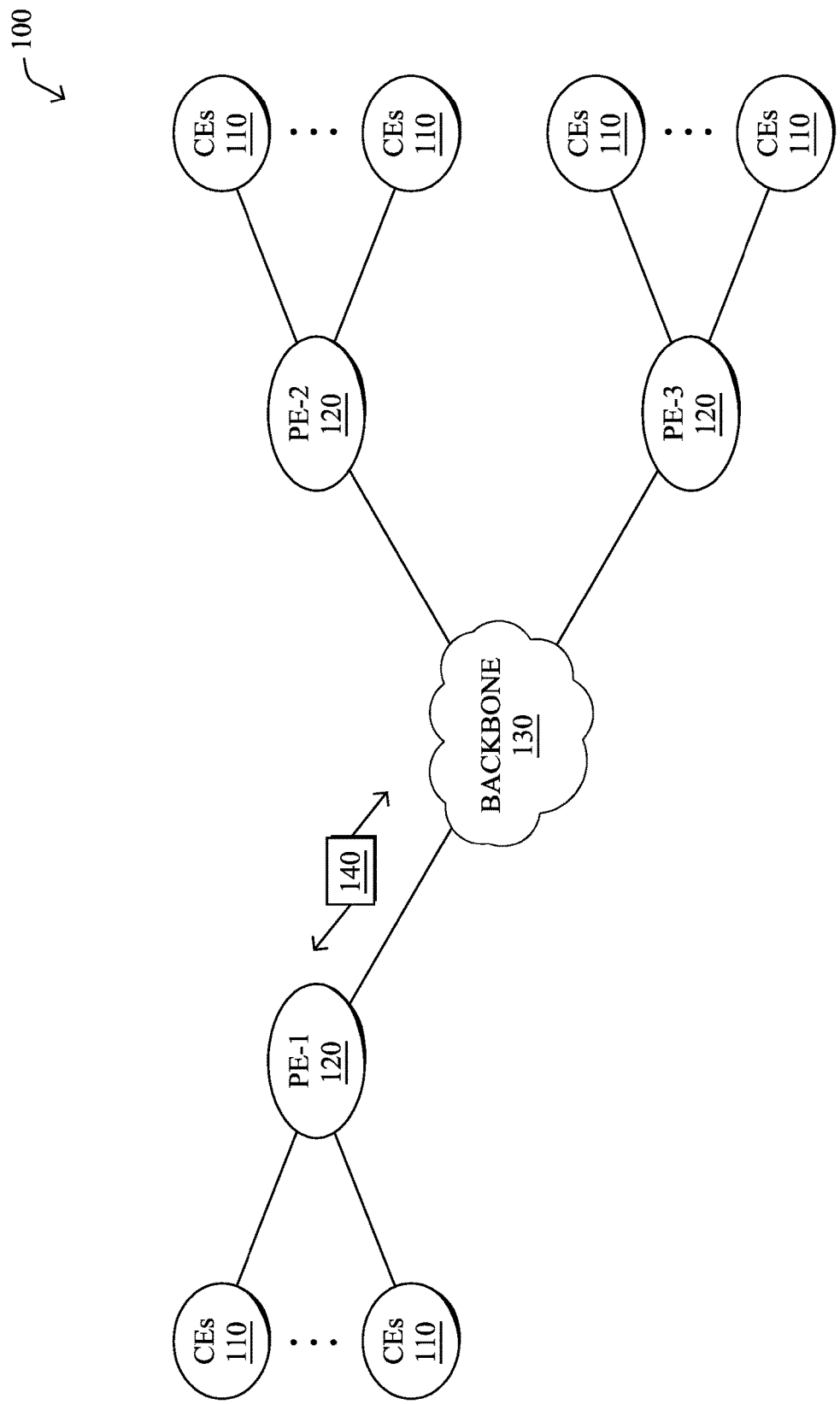
FIGS. 1A-1B illustrate an example communication network.

According to one or more embodiments of the disclosure, a labeling service receives telemetry data for a cluster of endpoint devices in a first network environment. The endpoint devices in the cluster are clustered by a device classification service based on their telemetry data and labeled by a device type classifier of the device classification service as being of an unknown device type. The labeling service obtains a first device type label for the cluster of endpoint devices via a first user interface. The labeling service identifies one or more other network environments in which endpoint devices are located that have similar telemetry data as that of the cluster of endpoint devices. The labeling service obtains device type labels for the cluster of endpoint devices via a selected set of user interfaces from the identified one or more other network environments. The labeling service validates the first device type label for the cluster using the device type labels obtained via the selected set of user interfaces from the identified one or more other network environments.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors)

result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
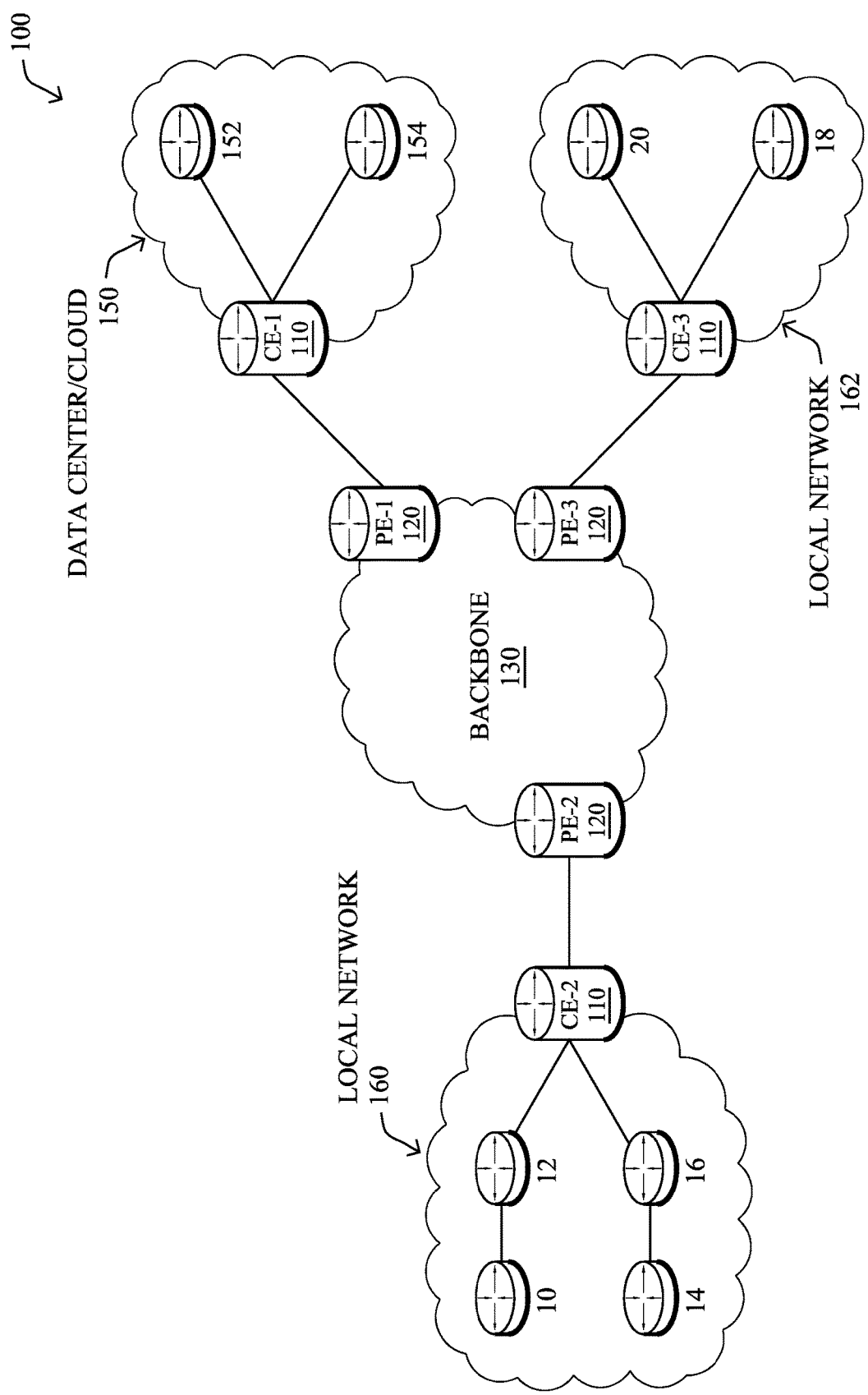

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
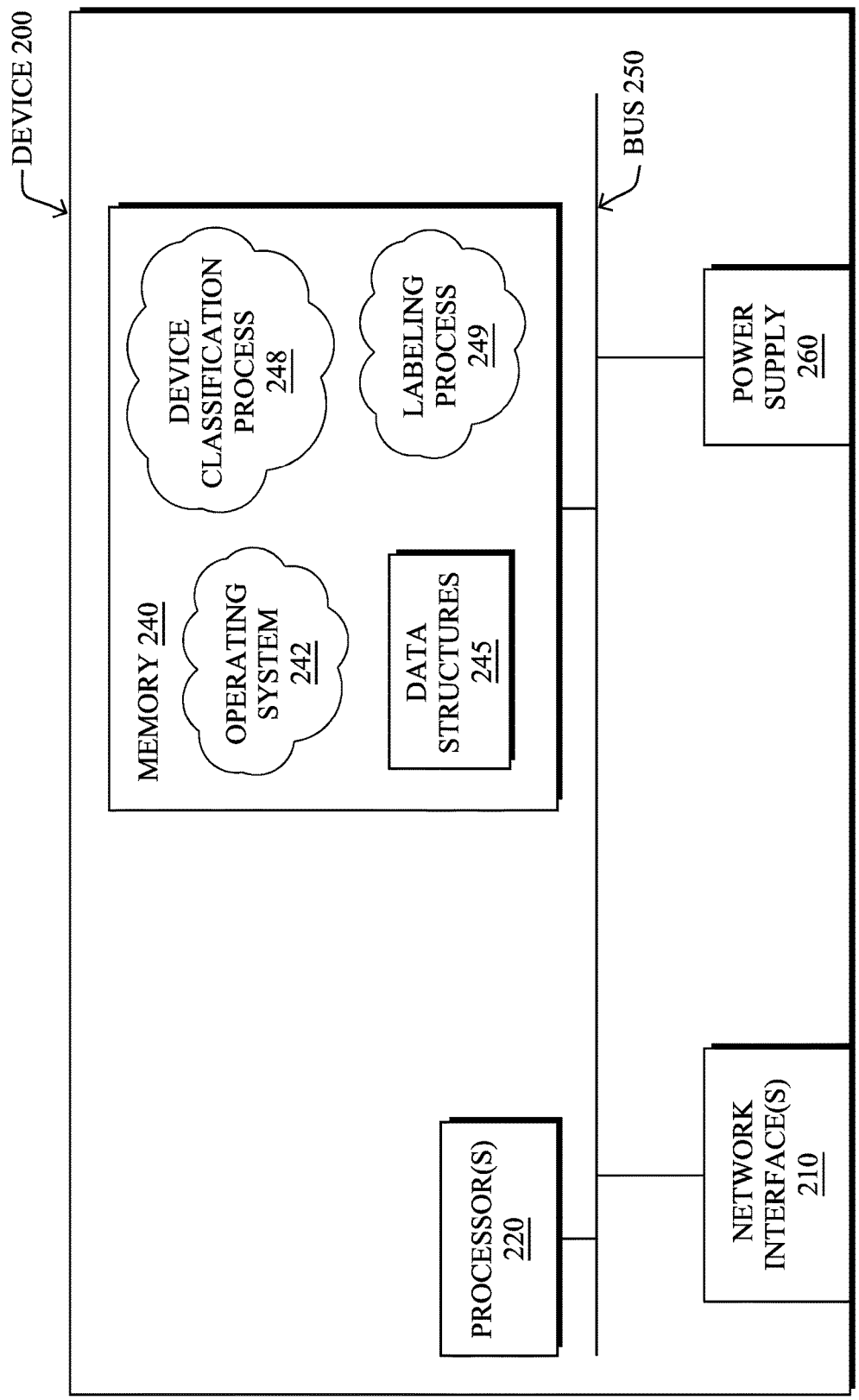
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a labeling process 249, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
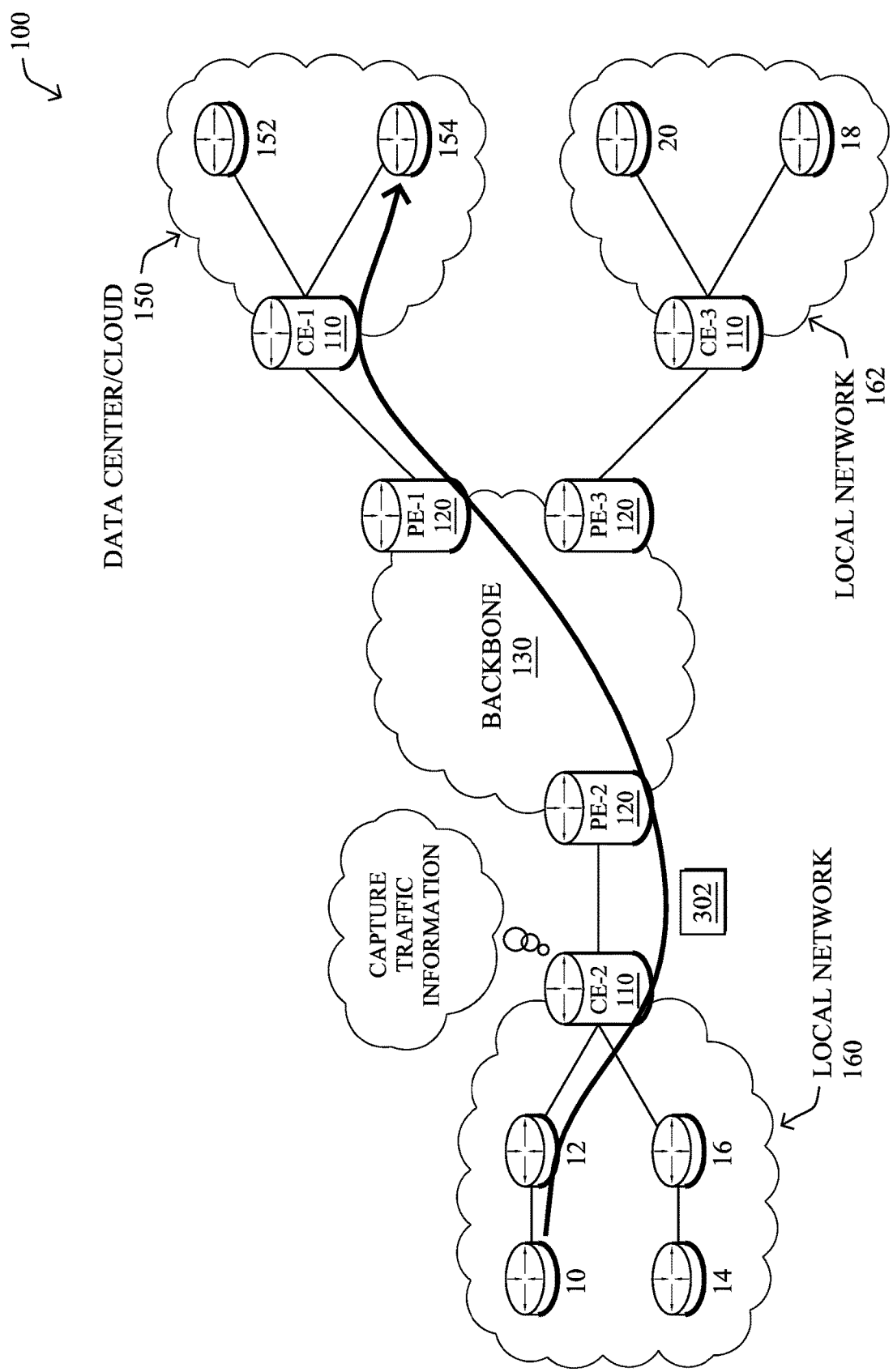
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
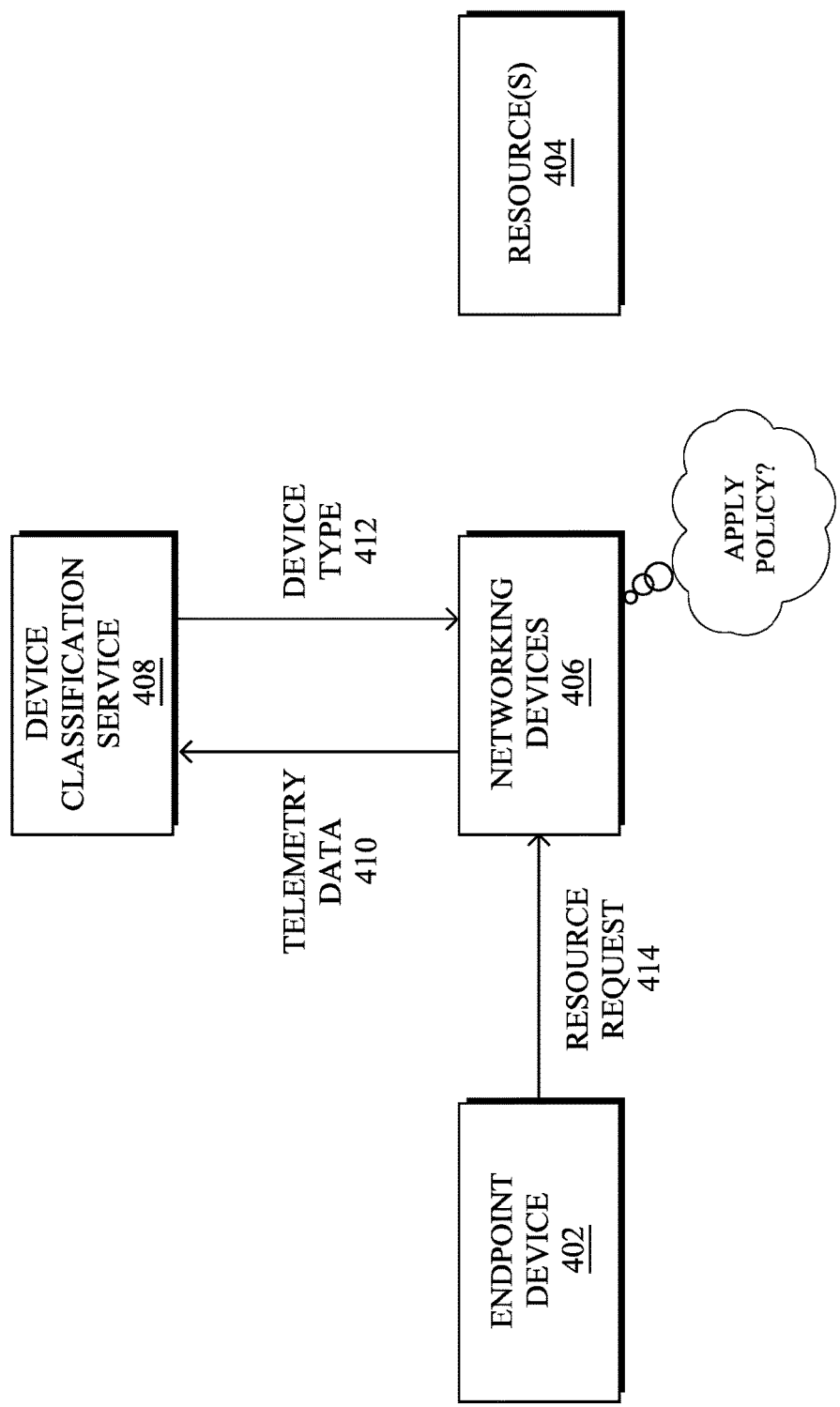
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:
    DHCP probes with helper addresses
    SPAN probes, to get messages in INIT-REBOOT and
        SELECTING states, use of ARP cache for IP/MAC
        binding, etc.
    Netflow probes HTTP probes to obtain information such as the OS of the device, Web browser information, etc.

RADIUS probes

SNMP to retrieve MIB object or receives traps

DNS probes to get the Fully Qualified Domain Name (FQDN)

etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

As noted above, a device classification service may leverage machine learning to label endpoint devices in a network with device types. Preliminary testing has shown that machine learning is particularly well suited for this purpose, as the classifier is able to label new endpoint devices, if their behaviors are similar to those of previously labeled endpoint devices. For example, the device type classifier may include a multi-class classification model such as a decisions tree based model (e.g., a random forest, etc.) trained using telemetry samples labeled with the known device types of their associated endpoint devices. In further cases, the device type classifier may leverage a machine learning-based clustering approach that uses the traffic telemetry data as input and attempts to group similarly behaving devices by their network traffic behaviors. The classifier can then propagate the device type labels of known endpoint devices to other endpoint devices in their behavioral clusters. For example, if an endpoint device under scrutiny belongs to a particular behavioral cluster based on its traffic telemetry, and that cluster includes one or more endpoint devices known to have a particular device type, the endpoint device under scrutiny can also be labeled with that device type.

While machine learning is potentially quite powerful for purposes of performing device type classifications, such approaches also require a set of labeled examples on which the classifications are to be based. In some cases, the device classification service can use active learning whereby experts are asked to provide labels for groups of endpoint devices labeled by the classifier as 'UNKNOWN,' so that the classifier can learn new device behaviors over time. In some cases, the active learning mechanism may adaptively balance multiple criteria when optimizing for the best clusters to ask the users to label, based on their success rates in correctly labeling devices and/or on other implicit feedback signals.

A key challenge to active learning of device type labels relates to the quality of labels provided to the system by a user. In particular:

Labels may be inconsistent between different network environments. For example, if free-form text input is allowed, different users may use different spellings, abbreviations, etc. In general, even with constrained outputs, users may select slightly different classifications.

Users are not perfect labelers. Indeed, even the most expert user may occasionally make gross mistakes by providing a label that has nothing to do with the real underlying device type of the cluster.

If the classifier is augmented with the wrong device label for any of the above reasons, this could result in the networking devices in the network applying the wrong network policy to an endpoint device. Consequently, the endpoint device may be able to access resources that it should not, presenting a potential security risk, receive a higher QoS policy, impeding other traffic in the network, etc.

Active Labeling of Unknown Devices in a Network

The techniques herein make use of advanced crowd sourcing to validate device type labels (for unknown device type categories) provided by a user. In some aspects, the labeling service may select the number of required alternate labeling users from among a pool of users having similar unknown devices in their network environments. Such selections may be made dynamically based on, for example, the unknown device cluster characteristics, the criticality of those devices, and/or the level of agreement required for a label to be validated. In further aspects, a validated device type label can be sent to a device type classifier, to augment the degree of coverage of the classifier and, thus, further reduce the number of unknown devices.

Specifically, according to one or more embodiments of the disclosure as described in detail below, a labeling service receives telemetry data for a cluster of endpoint devices in a first network environment. The endpoint devices in the cluster are clustered by a device classification service based on their telemetry data and labeled by a device type classifier of the device classification service as being of an unknown device type. The labeling service obtains a first device type label for the cluster of endpoint devices via a first user interface. The labeling service identifies one or more other network environments in which endpoint devices are located that have similar telemetry data as that of the cluster of endpoint devices. The labeling service obtains device type labels for the cluster of endpoint devices via a selected set of user interfaces from the identified one or more other network environments. The labeling service validates the first device type label for the cluster using the device type labels obtained via the selected set of user interfaces from the identified one or more other network environments.

Illustratively, the techniques described herein may be performed by hardware, software, and/or firmware, such as in accordance with the labeling process 249, which may include computer executable instructions executed by the processor 220 (or independent processor of interfaces 210) to perform functions relating to the techniques described herein, e.g., in conjunction with device classification process 248.

Figure 5:
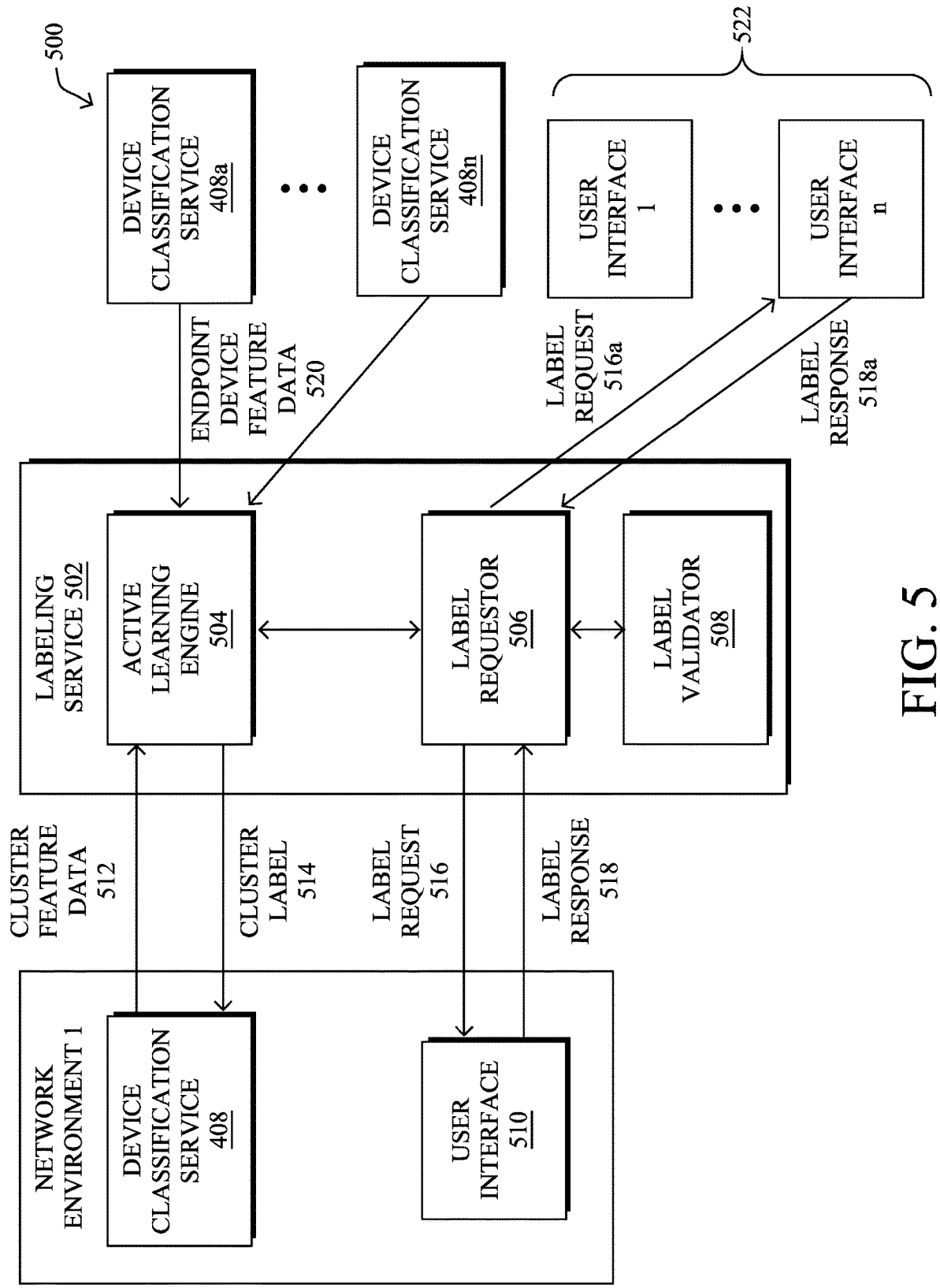
FIG. 5 illustrates an example architecture for the active labeling of unknown devices in a network.

Operationally, FIG. 5 illustrates an example architecture 500 for the active labeling of unknown devices in a network. At the core of architecture 500 is a labeling service 502 that may be implemented, for example, by execution of labeling process 249. In various embodiments, labeling service 502 may include any or all of the following components: an active learning engine 504, a label requestor 506, and/or a label validator 508. These components 502-506 may be implemented in a distributed manner or implemented on a single device. In addition, some or all of components 502-506 may be implemented as part of a monitored network or part of a cloud-based service. The functionalities of the components of architecture 500 may also be combined, omitted, or implemented as part of other processes, as desired.

As shown, assume that labeling service 502 is in communication with device classification service 408, described previously with respect to FIG. 4, that is located in a first network environment. During execution, labeling service 502 may operate in conjunction with device classification service 408 to implement an active learning control loop, through execution of an active learning engine 504. For example, assume that device classification service 408 uses machine learning-based clustering to group similarly behaving endpoint devices located in its network environment, but is unable to classify the cluster with sufficient confidence, leading to these devices being labeled as 'UNKNOWN.' In such a case, device classification service 408 may send cluster feature data 512 to labeling service 502, to seek out a device type label for the cluster of endpoint devices. In response, labeling service 502 may obtain a device label for the cluster and provide the cluster label 514 back to device classification service 408. By doing so, device classification service 408 can use the cluster label 514 to update its classifier, accordingly.

Figure 6:
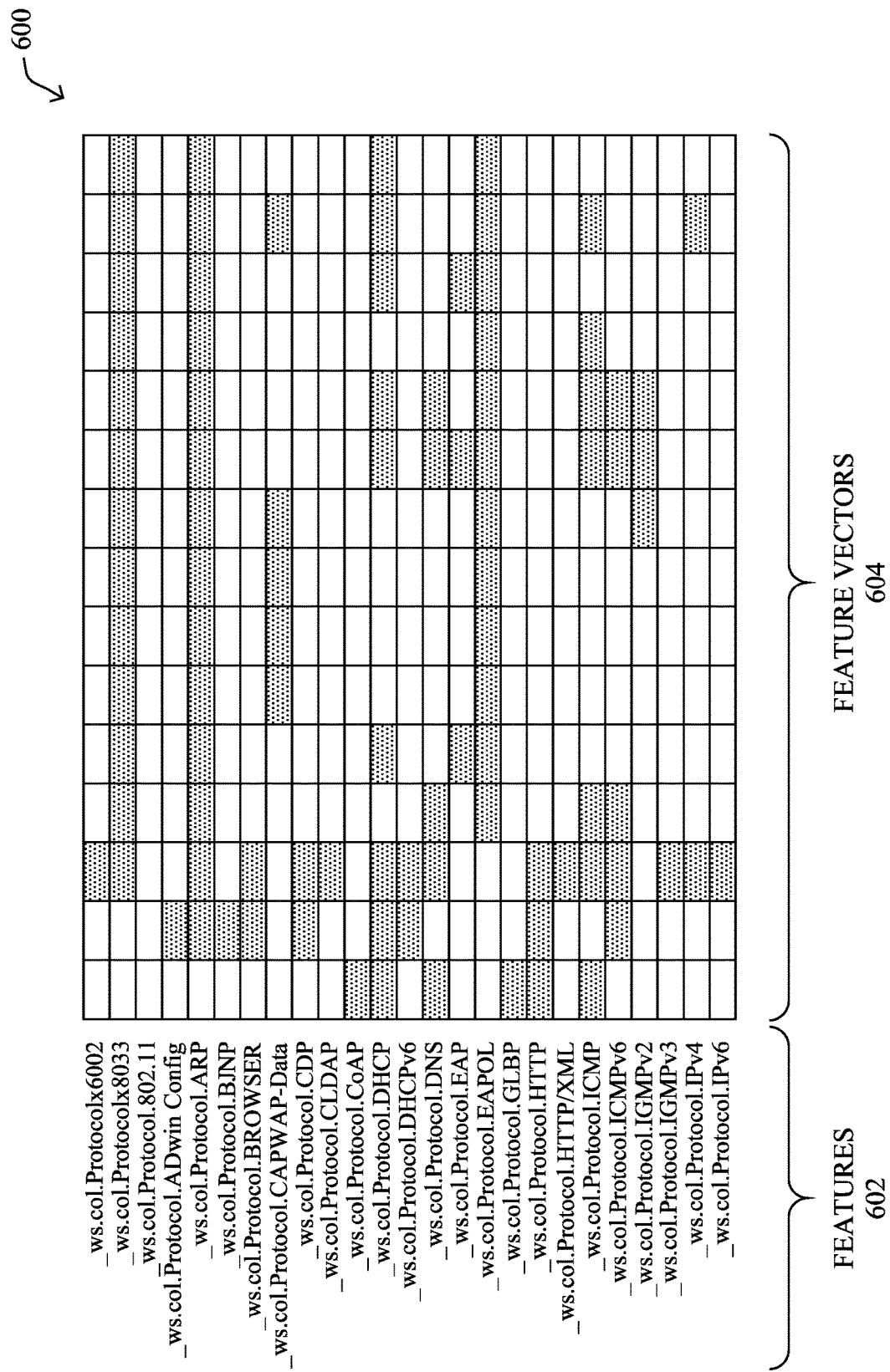
FIG. 6 illustrates an example set of traffic feature vectors.

FIG. 6 illustrates an example set 600 of telemetry feature vectors 604 for endpoint devices in a network that can be used as input to a device type classifier and provided to a labeling service when the classifier is unable to assign a device type to the endpoints. In general, each feature vector 604 may be associated with a specific endpoint device and include information regarding any number of potential traffic features 602 that may be observed in the traffic for that endpoint device. For example, each dimension of a feature vector 604 may represent the presence or absence of a certain protocol such as, but not limited to, IPv6, IPv4, IGMPv3, IGMPv2, ICMPv6, ICMP, HTTP/XML, HTTP, etc. In some cases, entries in a feature vector 604 may be on a binary basis, to indicate whether a given protocol was seen in the traffic of the endpoint device or not. In other cases, entries in a feature vector 604 may be more complex, such as assigning a weighting for each feature 602 based on the frequency at which that feature was observed in the traffic of the endpoint device or on any other criteria as desired.

By way of example, consider the first three feature vectors 604 in FIG. 6. As shown, entries in feature vectors 604 include binary indications as to whether a given feature 5602 was observed in the traffic for their associated endpoint devices. In particular a shaded entry in feature vectors 604 indicates the presence of the corresponding feature 602 in the traffic of that endpoint device, while an empty entry indicate the absence of that feature in the traffic. For example, the first three feature vectors in feature vectors 604 indicate that their corresponding endpoint devices do not exhibit any 802.11 or EAPOL protocol activity and are likely from a wired lab. Some devices represented by feature vectors 604 correspond to a CAPWAP packet trace, leading to similar artifacts. V6 protocols are also sometimes present in feature vectors 604, although not always.

Figure 7:
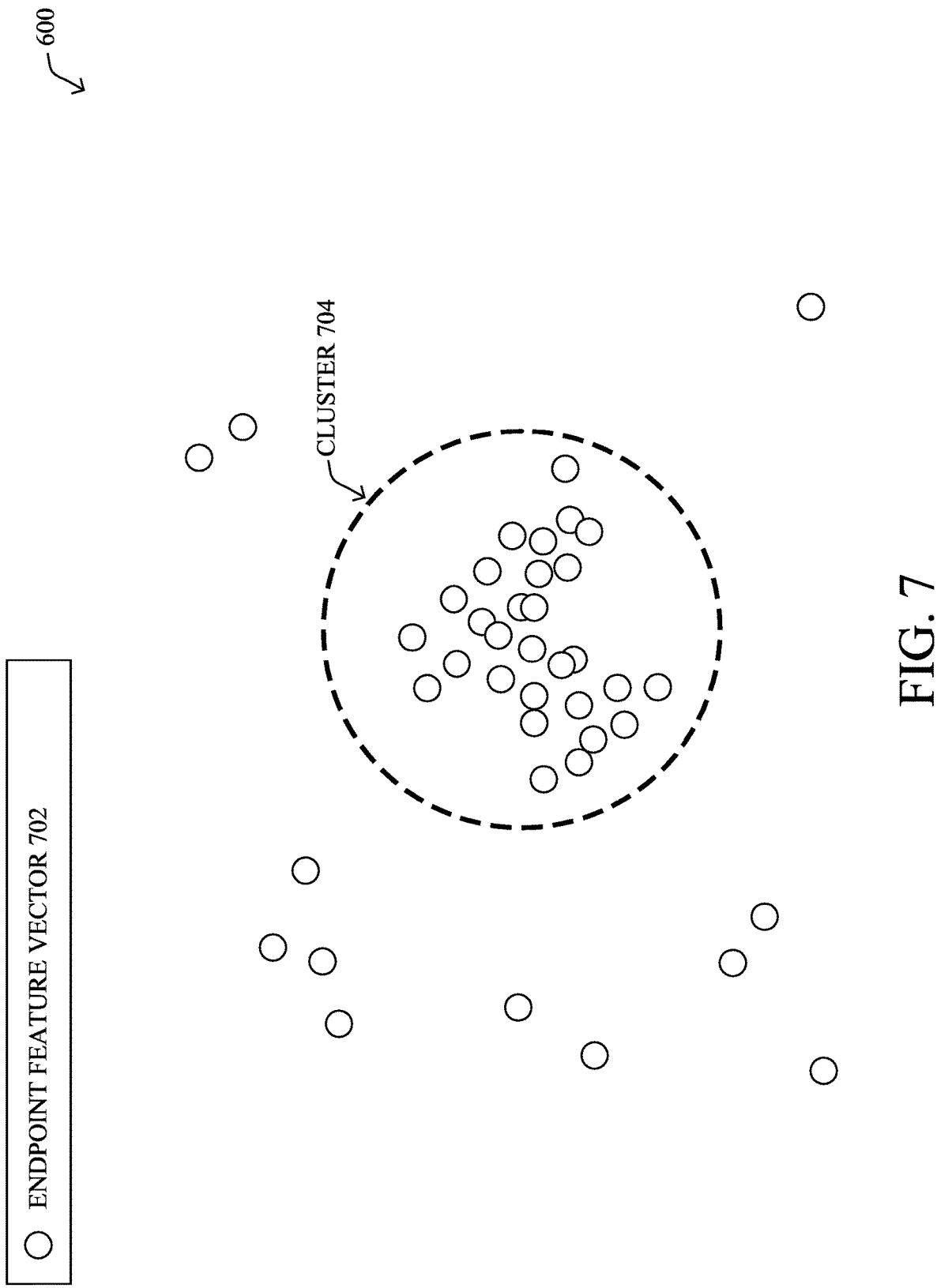
FIG. 7 illustrates an example of a cluster of similarly behaving endpoint devices.

FIG. 7 illustrates an example 700 of a cluster of similarly behaving endpoint devices. As noted above, endpoint devices may be represented by feature vectors constructed from their captured telemetry data. For purposes of illustration, example 700 is an extremely simplified example whereby endpoint feature vectors 702 are two dimensional. Although the notion may seem simple in this special case, in practice, the feature representation used may be of very high dimensionality, or even infinite dimension, if kernel techniques are employed.

Assume that some of endpoint feature vectors 702 are relatively close to one another in the feature space and are clustered together by a machine learning-based clustering process (e.g., of a device classification service) as part of cluster 704. In other words, the observed traffic features and/or other characteristics of the endpoint feature vectors 702 within cluster 704 are very similar to one another. If a device type label is associated with one or more of endpoint feature vectors 702 in cluster 704, this allows the device type classifier to propagate this label to any other feature vector 702 also within cluster 704 (or within a threshold distance thereto).

In some cases, however, it may be that the device type classifier is unable to label the endpoints/feature vectors 702 within cluster 704. This may be due to the endpoint devices being of a new type, the classifier not having the proper configuration to identify the device type, or for any other reason. In such cases, the classifier may flag those endpoints/feature vectors 702 in cluster 704 with an 'UNKNOWN' label or other label indicative of the inability of the classifier to identify their device type.

Referring again to FIG. 5, in response to receiving cluster feature data 512 (e.g., the telemetry feature vectors of the endpoint devices in an 'UNKNOWN' cluster, active learning engine 504 may identify other network environments in which similar 'UNKNOWN' endpoint devices are located. Said differently, active learning engine 504 may identify one or more other network environments in which endpoint devices are located that have similar telemetry data as that of the cluster of endpoint devices associated with cluster feature data 512. For example, assume that other device classification services 408a-408n (e.g., a first through $n^{th}$ device classification service) are located in one or more other networking environments. This may be the case in which labeling service 502 is implemented as a cloud service in communication with any number of different networks.

To identify the network environments having endpoint devices that are behaviorally similar to those associated with cluster feature data 512, active learning engine 504 may apply machine learning to endpoint device feature data 520 from device classification services 408a-408n. Such context may include a variety of input information such as the OUI, the types of protocols being used (behavioral variables), location, mobility patterns, or any other information regarding the endpoint devices in the other network environments.

When gathering a label for a given set of identical devices, active learning engine 504 may look for other environments where similar unknown device types exist. In its simplest form, active learning engine 504 may select network environments that have similar devices, as grouped by a machine learning-based clustering process or any other devices that look similar (e.g., devices that belong to a close cluster according to some similarity distance). In another embodiment, active learning engine 504 may select a different labeling user of the same environment, as opposed to a user that belongs to a different environment.

Said differently, active learning engine 504 may select an initial user to provide a label to the cluster of endpoint devices associated with cluster feature data 512, either from their original network environment or, alternatively, from another network environment in which identical endpoint devices are located (e.g., devices that have identical feature data/behaviors as those in the cluster). For example, active learning engine 504 may select an expert user associated with user interface 510 in the initial network environment. In such a case, label requestor 506 may send a label request 516 to user interface 510 with cluster feature data 512 and, in response, receive a label response 518 with an indication of the device type for the cluster. Alternatively, active learning engine 504 may select another user from another network environment to provide the cluster label. For example, label requestor 506 may send a label request 516a to another user interface in user interfaces 522 located in another network environment and receive a label response 518a, in response.

As noted, reliance on a single cluster label to update the classifier of device classification service 408 can lead to security and other network issues, if the user provides the wrong device type label. Accordingly, labeling service 502 may also include a label validator 508 configured to validate the label provided by the user above.

In order to validate a cluster label, active learning engine 504 may select K (different) users, and their corresponding user interfaces, from among the set of N-number of users having similar (or close enough) devices in their network environments to the unknown device type for which a label is required from the user described above. In a simple embodiment, label validator 508 may require a minimum of L (different) users with L≤K to fully validate the label provided by the initial user (called user A). In another embodiment, active learning engine 504 may employ a trust score, to determine the number of (different) L labels required to validate the label of user A. The number L may vary with the trust scores of the (different) users required. For example, a highly trusted user A may require fewer confirmations from other users (smaller L), to validate the label. Note that active learning engine 504 may compute the trust score according to the number of times a label has been validated by all other users or the agreement rate with other users upon confirming labels. Such a trust score may also be a function of the type of device type for which a label is required; since the device is, by definition, unknown, active learning engine 504 may make use of a distance to other clusters for which a reliable label has been provided by a user (e.g., a user A that labeled device types close to the cluster containing the UNKNOWN device is likely to have more expertise and consequently trust score).

Orthogonally, active learning engine 504 may also modulate the number L of confirmation label requests based on the similarity of the devices within the group under consideration. For example, if active learning engine 504 determines that another network environment includes "identical" endpoint devices as that of the cluster, there will often be a relatively small degree of uncertainty in the additional device type labels. Conversely, if the endpoint devices in the other network environment(s) are less similar to those in the cluster, this means that the degree of uncertainty in the labels is higher and engine 504 may increase L to reflect a more difficult labeling case.

In some embodiments, active learning engine 504 may also blacklist users that are often in disagreement with other users. For example, if a given user is constantly in disagreement with the other labelers, engine 504 may set the trust score of that user to zero, potentially for a set period of time, so as to prevent that user from being selected to label other clusters. In yet another embodiment, active learning engine 504 may also take into account the total number of labeling requests and/or the rate of labeling requests of a given user, so avoid overwhelming those users, which may eventually impact the quality of their labeling.

Note that labeling service 502 may also keep the identities of the labeling users and/or the other network environments hidden from a given user, for confidentiality reasons.

Once active learning engine 504 has selected the set of users and their corresponding user interfaces (e.g., interfaces 522 via which the selected users log into labeling service 502), label requestor 506 may send a custom label request message to each of the L-number of (different) users, to validate the label provided by user A (with L being dynamically computed, as explained above). For example, if the user of user interface 510 provided the initial label response 518 to label requestor 506, label requestor 506 may send a subsequent label request 516a to one or more of user interfaces 522, to validate that label. Each of the label requests sent to the selected users/user interfaces 522 may include cluster feature data 512 and, in some embodiments, the label from user A, as well. In other embodiments, no label is provided to the verifying users, to avoid contaminating their opinions.

Once label requestor 506 has obtained the device type labels from the initial user (user A) and the validating users, label validator 508 may use the additional label information to validate the initial label. To do so, a simple approach would be to use a majority (or unanimity) vote between all labels provided by the users for the label, to move the initial label to a CONFIRM state. In one embodiment, the required percentage of agreement (P labels identical/L users) used by label validator 508 may be governed by the criticality of the required label governed by policy. For example, very large clusters of UNKOWN devices may require a higher percentage of agreement.

In further embodiments, label validator 508 may also take into account indexes of compromise (IoCs) associated with the endpoint devices of the cluster, to determine the requisite number of users in agreement needed to validate a device type label. For example, assume that a security service in the first network environment flags the endpoint devices in the cluster as having relatively high IoCs. Such information can then be provided to labeling service 502 either directly from the security service or included in cluster feature data 512. In such cases, active learning engine 504 may require a higher number L of users and/or label validator 508 may require a higher percentage of agreement among the selected users/user interfaces to validate a label.

If label validator 508 validates the label from the initial user (user A), active learning engine 504 may then provide the label to device classification service 408 as cluster label 514, thereby initiating retraining of the device type classifier of service 408. However, if label validator 508 determines that the minimum percentage of agreement is not met, label validator 508 may send a signal back to the clustering mechanism of active learning engine 504 in charge of identifying the similar endpoint devices and/or the clustering mechanism of device classification service 408. Indeed, if users tend to not agree on the device type, this may be an indication of incorrect clustering (e.g., the clustering is too coarse). Such a feed-back loop can be used to refine the approach for grouping devices by degree of similarity. In turn, the procedure described above can be restarted, once a new clustering has taken place, to select a new set of users to provide labels. Trust score may be provided (if above a given threshold) to the requested user for labeling, as a basic gamification technique (e.g., users with high trust score for a given category of device type are told that the request is sent to them because of their reputation score).

When labels are of free-form, naming regularization techniques may be required, in order to reconcile potential labels that refer to the same device type. To that end, label requestor 506 may employ techniques such as stemming and lemmatization, to normalize the label responses.

A key function of labeling service 502 is that all labels confirmed as valid by label validator 508 can be provided to the classification engine of device classification service 408. In addition to the provided label 514, all contextual information related to the devices belonging to the cluster for which a new label has been provided (and validated) can be sent to the classifier which, in turn, can be retrained. Device classification service 408 can perform the classifier retraining each time a new device type is identified by labeling service 502 or, alternatively, in batches.

For new labels provided by labeling service 502 to device classification service 408, the classifier may keep track of the classification error rate. In some cases, service 408 may also employ various techniques to validate that the classification is indeed correct. Special care should be taken with respect to the error rate related to labels learned thanks to crowd sourcing. Indeed, a higher error rate may be indicative of poor fidelity for the labels learned thanks to the techniques herein. In another embodiment, device classification service 408 may also provide feedback to labeling service 502, so as to dynamically increase the requirements for labels related to classes where the error rate is too high (e.g., increase L, percentage of agreements, etc.).

Figure 8:
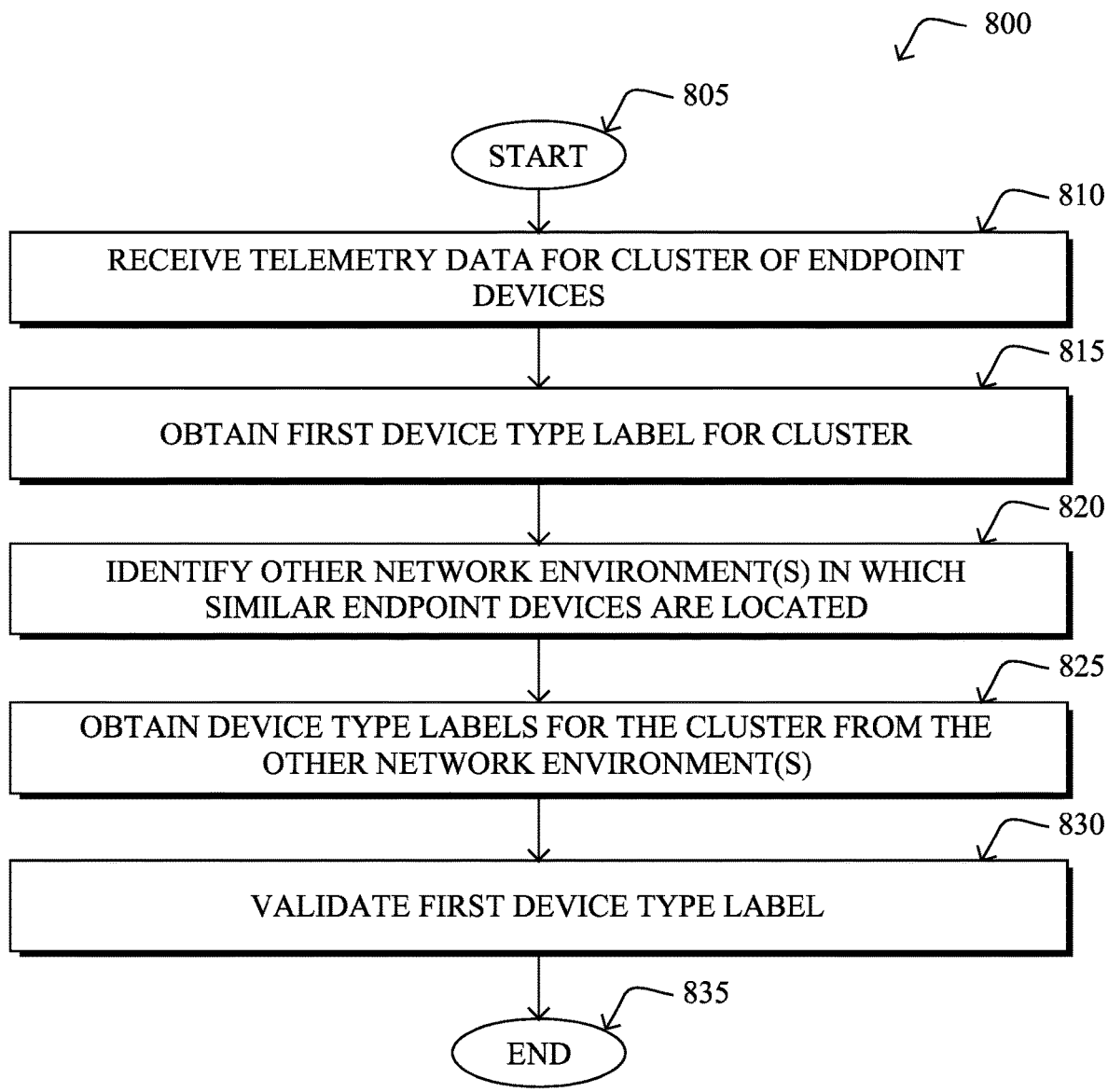
FIG. 8 illustrates an example simplified procedure for the active labeling of unknown devices in a network.

FIG. 8 illustrates an example simplified procedure for the active labeling of unknown devices in a network, in accordance with one or more embodiments described herein. For example, a non-generic, specifically configured device (e.g., device 200) may perform procedure 800 by executing stored instructions (e.g., process 249), to provide a labeling service to one or more device classification services. The procedure 800 may start at step 805, and continues to step 810, where, as described in greater detail above, the labeling service may receive telemetry data for a cluster of endpoint devices in a first network environment. In various cases, the endpoint devices in the cluster may be clustered by a device classification service based on their telemetry data and labeled by a device type classifier of the device classification service as being of an unknown device type.

At step 815, as detailed above, the labeling service may obtain a first device type label for the cluster of endpoint devices via a first user interface. For example, the labeling service may send the telemetry data for the cluster to a user interface associated with a user in the first network environment or to a user in another network environment having endpoint devices with identical telemetry data. In response, the service may receive a device type label from the user interface for the endpoint devices in the cluster.

At step 820, the labeling service may identify one or more other network environments in which endpoint devices are located that have similar telemetry data as that of the cluster of endpoint device, as described in greater detail above. For example, if the labeling service is a cloud-based service and the first network environment is a first network that uses the labeling service, the labeling service may identify one or more other networks that also use the labeling service, based on those networks also having similarly behaving devices.

At step 825, as detailed above, the labeling service may obtain device type labels for the cluster of endpoint devices via a selected set of user interfaces from the identified one or more other network environments. In general, the labeling service may select the user interfaces based on their corresponding users and/or the degree of similarity between the devices in the cluster and those in the network environment associated with the user. In various embodiments, the labeling service may select the set of user interfaces to which label request are to be sent based on any or all of the following: a trust score associated with the user from step 815 (e.g., a highly trusted user may require fewer validator), trust scores associated with the validating users (e.g., untrusted or blacklisted users may be excluded, higher trusted validating users may require a smaller group, etc.), the similarity between the devices in the other network environments to those in the cluster (e.g., fewer requests may be needed if the other environments include identical devices as those in the cluster), how often or frequently users have been asked to label clusters, or any consideration.

At step 830, the labeling service may validate the first device type label for the cluster using the device type labels obtained via the selected set of user interfaces from the identified one or more other network environments, as described in greater detail above. Such validation may entail, for example, determining whether the device type labels from the other network environments agree with that of the first device type label by a threshold or majority amount. If so, the labeling service may provide the first device type label back to the device classification service, thereby allowing the classification service to retrain its classifier with the new label. If not, this may indicate that either the first device type label was wrong or the selection of validating users was too inclusive. For example, if the set of devices considered to be similar to those in the cluster is too expansive, this may lead to disagreements among the validating users. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the refinement of active learning of device type labels by a device type classification service. In particular, multiple device labels can be used to validate a device type label for a cluster of endpoint devices, prior to using the label to retrain the classifier.

While there have been shown and described illustrative embodiments that provide for active labeling of unknown devices in a network, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a labeling service, telemetry data for a cluster of endpoint devices in a first network environment, wherein a device classification service clusters the endpoint devices in the cluster based on their telemetry data, further wherein a device type classifier of the device classification service labels the endpoint devices in the cluster as being of an unknown device type that does not match existing device profiles of the device type classifier;
obtaining, by the labeling service, a first device type label for the cluster of endpoint devices via a first user interface of user interfaces;
identifying, by the labeling service, one or more other network environments where telemetry data that is similar to that of the cluster of endpoint devices is gathered from endpoint devices, wherein the one or more other network environments is different than the first network environment;
selecting, by the labeling service, a set of user interfaces of the user interfaces from the identified one or more other network environments;
obtaining, by the labeling service, device type labels for the cluster of endpoint devices via the selected set of user interfaces, wherein the obtained device type labels are crowd sourced from manual entries by one or more users at the selected set of user interfaces; and
validating, by the labeling service, the first device type label for the cluster using the device type labels obtained via the selected set of user interfaces from the identified one or more other network environments.

2. The method as in claim 1, further comprising:
initiating retraining of the device type classifier using the validated device type label for the cluster of endpoint devices.

3. The method as in claim 1, wherein the labeling service is a cloud-based service, and wherein the other network environments are networks that are remote from first network environment.

4. The method as in claim 1, wherein validating the first device type label for the cluster using the device type labels obtained via the selected set of user interfaces from the identified one or more other network environments comprises:
determining whether a threshold number of the device type labels obtained via the selected set of user interfaces match the first device type label.

5. The method as in claim 4, wherein the threshold is based on a trust score associated with a user of the first user interface.

6. The method as in claim 5, wherein the threshold is based further on trust scores associated with the selected set of user interfaces.

7. The method as in claim 4, wherein the threshold is based in part on indexes of compromise associated with the endpoint devices in the cluster by a security engine of the first network environment.

8. The method as in claim 1, wherein the set of user interfaces is selected based in part on at least one of: a trust score associated with users of the set of user interfaces, how frequently the users of the set of user interfaces have been asked to provide device type labels for clusters, and measures of similarity between the telemetry data of the endpoint devices located in the one or more other network environments and the telemetry data of the endpoint devices in the cluster in the first network environment.

9. The method as in claim 1, wherein validating the first device type label for the cluster using the device type labels obtained via the selected set of user interfaces from the identified one or more other network environments comprises:
determining that the device type labels obtained via the selected set of user interfaces do not agree with the first device type label; and, in response,
adjusting a clustering process used to identify the endpoint devices in the identified one or more other network environments that have similar telemetry data as that of the cluster of endpoint devices, based on the determination.

10. The method as in claim 1, wherein obtaining the device type labels for the cluster of endpoint devices via the selected set of user interfaces from the identified one or more other network environments comprises:
sending label request to the selected set of user interfaces that include the telemetry data for the cluster.

11. An apparatus, comprising:
one or more network interfaces to communicate with a network;
a processor coupled to the network interfaces and configured to execute one or more processes; and
a memory configured to store a process executable by the processor, the process when executed configured to:
receive telemetry data for a cluster of endpoint devices in a first network environment, wherein a device classification service clusters the endpoint devices in the cluster based on their telemetry data, further wherein a device type classifier of the device classification service labels the endpoint devices in the cluster as being of an unknown device type that does not match existing device profiles of the device type classifier;
obtain a first device type label for the cluster of endpoint devices via a first user interface of user interfaces;
identify one or more other network environments where telemetry data that is similar to that of the cluster of endpoint devices is gathered from endpoint devices, wherein the one or more other network environments is different than the first network environment;
select a set of user interfaces of the user interfaces from the identified one or more other network environments;
obtain device type labels for the cluster of endpoint devices via the selected set of user interfaces of the user interfaces, wherein the obtained device type labels are crowd sourced from manual entries by one or more users at the selected set of user interfaces; and
validate the first device type label for the cluster using the device type labels obtained via the selected set of user interfaces from the identified one or more other network environments.

12. The apparatus as in claim 11, wherein the process when executed is further configured to:
initiate retraining of the device type classifier using the validated device type label for the cluster of endpoint devices.

13. The apparatus as in claim 11, wherein the apparatus validates the first device type label for the cluster using the device type labels obtained via the selected set of user interfaces from the identified one or more other network environments by:

determining whether a threshold number of the device type labels obtained via the selected set of user interfaces match the first device type label.

14. The apparatus as in claim 13, wherein the threshold is based on a trust score associated with a user of the first user interface.

15. The apparatus as in claim 14, wherein the threshold is based further on trust scores associated with the selected set of user interfaces.

16. The apparatus as in claim 13, wherein the threshold is based in part on indexes of compromise associated with the endpoint devices in the cluster by a security engine of the first network environment.

17. The apparatus as in claim 11, wherein the set of user interfaces is selected based in part on at least one of: a trust score associated with users of the set of user interfaces, how frequently the users of the set of user interfaces have been asked to provide device type labels for clusters, and measures of similarity between the telemetry data of the endpoint devices located in the one or more other network environments and the telemetry data of the endpoint devices in the cluster in the first network environment.

18. The apparatus as in claim 11, wherein the apparatus validates the first device type label for the cluster using the device type labels obtained via the selected set of user interfaces from the identified one or more other network environments by:
 determining that the device type labels obtained via the selected set of user interfaces do not agree with the first device type label; and, in response,
 adjusting a clustering process used to identify the endpoint devices that have similar telemetry data as that of the cluster of endpoint devices, based on the determination.

19. The apparatus as in claim 11, wherein the apparatus obtains the device type labels for the cluster of endpoint devices via the selected set of user interfaces from the identified one or more other network environments by:
 sending label request to the selected set of user interfaces that include the telemetry data for the cluster.

20. A tangible, non-transitory, computer-readable medium storing program instructions that cause a labeling service to execute a process comprising:
 receiving, at the labeling service, telemetry data for a cluster of endpoint devices in a first network environment, wherein a device classification service clusters the endpoint devices in the cluster based on their telemetry data, further wherein a device type classifier of the device classification service labels the endpoint devices in the cluster as being of an unknown device type that does not match existing device profiles of the device type classifier;
 obtaining, by the labeling service, a first device type label for the cluster of endpoint devices via a first user interface of user interfaces;
 identifying, by the labeling service, one or more other network environments where telemetry data that is similar to that of the cluster of endpoint devices is gathered from endpoint devices, wherein the one or more other network environments is different than the first network environment;
 selecting, by the labeling service, a set of user interfaces of the user interfaces from the identified one or more other network environments;
 obtaining, by the labeling service, device type labels for the cluster of endpoint devices via the selected set of user interfaces, wherein the obtained device type labels are crowd sourced from manual entries by one or more users at the selected set of user interfaces; and
 validating, by the labeling service, the first device type label for the cluster using the device type labels obtained via the selected set of user interfaces from the identified one or more other network environments.

\* \* \* \* \*